United States Patent [19]
Siol et al.

[11] Patent Number: 5,430,104
[45] Date of Patent: Jul. 4, 1995

[54] POLYMER MIXTURES WITH LOWER CRITICAL SOLUTION TEMPERATURE (LCST) BEHAVIOR

[75] Inventors: Werner Siol, Darmstadt; Ulrich Terbrack, Reinheim, both of Germany

[73] Assignee: Roehm GmbH Chemische Fabrik, Darmstadt, Germany

[21] Appl. No.: 195,339

[22] Filed: Feb. 14, 1994

[30] Foreign Application Priority Data

Feb. 13, 1993 [DE] Germany .................. 43 04 340.2

[51] Int. Cl.⁶ .................. C08L 29/12; C08L 25/16
[52] U.S. Cl. .................. 525/231; 525/931; 525/932; 524/515
[58] Field of Search .................. 525/231, 931, 932

[56] References Cited

U.S. PATENT DOCUMENTS

| | | | |
|---|---|---|---|
| 2,861,899 | 11/1958 | Sylvester et al. | 525/231 |
| 3,497,574 | 2/1970 | Press | 525/231 |
| 5,080,978 | 1/1992 | Kulzick et al. | 525/231 |

FOREIGN PATENT DOCUMENTS 0177063 4/1986 European Pat. Off. .
0181485 5/1986 European Pat. Off. .

OTHER PUBLICATIONS

Mat. Res. Soc. Symp. Proc., vol. 79, 1987, E. W. Fischer, "Neutron and Light Scattering Studies of Compatible Polymer Blends", pp. 73–87.

Primary Examiner—Carman J. Seccuro, Jr.
Attorney, Agent, or Firm—Oblon, Spivak, McClelland, Maier, & Neustadt

[57] ABSTRACT

Polymer mixtures made from two different polymer components and exhibiting LCST behavior are provided for use in applications which require temperature-dependent light permeability. The polymer mixtures P are made from:
  P1: from 98 to 2% by weight of poly-α-methylstyrene (PAMs); and
  P2: from 2 to 98% by weight of polyvinyl methyl ether (PVMe).

9 Claims, 3 Drawing Sheets

POLYMER MIXTURES WITH LOWER CRITICAL SOLUTION TEMPERATURE (LCST) BEHAVIOR

BACKGROUND OF THE INVENTION

1. Field of the Invention

The present invention relates to polymer mixtures comprised of poly-α-methylstyrene and polyvinyl methyl ether which exhibit lower critical solution temperature (LCST) behavior.

2. Description of the Background

Mixtures of polyvinyl methyl ether (PVMe) and polystyrene are among the best-studied "polymer blend" systems. They are frequently referred to as illustrations of the physical chemical model for explaining LCST behavior (see Nishi, T., et al., 1975 *Macromolecules*, 8 227; Kirk-Othmer, 1982, "Encyclopedia of chemical technology", Third Ed., "Vol 18, pub John Wiley, 443447; Ullmann's Encyclopedia of Industrial Chemistry, 1992, 5th Ed., Vol. 21A, pub. VCH, pp. 273–304). However, thus far, miscible (compatible) polymer systems are the exception. As noted in Ullmann's, ibid., Vol. 20A, 653:

"Plastic blends are usually immiscible because the combinatorial entropy of mixing is too small (high molar masses) and the enthalpy charges on mixing are often positive. Miscibility is observed for three types of systems:
1) Chemically similar systems, e.g. polystyrene-poly(o-chlorostyrene), showing both LCST and UCST.
2) Systems having specific interactions between different components, e.g. polystyrene-poly(vinyl methyl ether); these systems show only LCST.
3) Systems consisting of oligomers, e.g. oligo(ethylene oxide)-oligo (propylene oxide); these systems possess only UCST."

The existence of homogeneous, compatible polymer mixtures is demonstrated by, among other things, the occurrence of the phenomenon of LCST. The LCST phenomenon, which has a theoretical basis, consists of the fact that the miscibility of two nonidentical polymers decreases with increasing temperature. The LCST is thus experimentally determinable (see Olabisi, O., Robeson, L. M., and Shaw, M. T., "Polymer-polymer miscibility" pub Academic Press).

Neutron scattering and light scattering experiments have been used in the study of compatible polymer systems. (See Fischer, E. W., 1987 *Mater. Res. Soc. Symp. Proc.*, 79 73–86, *Chem.Abstr.*, 107, (20):176911q).

In the mid-1980s, technical applications of the LCST behavior of compatible polymer mixtures were proposed. EP 0,177,063 (cf. U.S. Pat. No. 4,722,595) employs such compatible polymer mixtures for recording, storing, and displaying optically readable information on a support. Optically detectable transitions from one phase into another under the influence of thermal energy (or energy forms directly convertible into thermal energy).

EP 0,181,485 (U.S. Pat. No. 4,722,506) provides window panel systems having temperature-dependent light permeability which are made of plastics. These window panel systems consist of a polymer mixture formed from at least two different polymer components and displaying an LCST<150° C. At temperatures below the LCST the mixtures exhibit a single phase, transparent mixture, while above the LCST the polymer components undergo demixing or phase separation. The indices of refraction of the polymer components must be different to provide the temperature dependant light-permeability effects.

The above European patents provide extensive information on, such details as rules for selection, preferred polymer combinations and technical application guidelines.

Nonetheless, the possible technical applications of the LCST phenomenon remain unexploited because of the basic constraints of incompatibility and unpredictability of properties in individual cases. For example, in contrast to polystyrene, poly-p-methylstyrene has been found to be completely incompatible with PVMe.

While the above-noted European patent applications disclose compatible polymer systems along with numerous application possibilities which are quite advantageous, the systems disclosed are still deficient in that there is no single embodiment which can optimally cover all of the application areas and desired temperature ranges. Further, in order to technically exploit these polymer systems not only must the LCST behavior be a reversible process, but the polymers themselves must meet criteria which are somewhat restrictive. In particular, in the area of thermotropic window panes (EP 0,181,485), and in the area of the recording, storage, and display of optically readable information (EP 0,101,485), sharp phase transitions within the shortest possible time are very desirable (EP 0,177,063).

SUMMARY OF THE INVENTION

Accordingly, one object of the present invention is to provide a polymer system prepared from dissimilar polymers, in which the system displays LCST behavior.

A further object of the present invention is to provide a polymer mixture which exhibits LCST behavior, in which the polymer mixture is made from poly-α-methylstyrene and polyvinyl methyl ether.

Another object of the present invention is to provide a polymer mixture which has LCST properties and a sharp transition of temperature dependent light permeability.

These and other objects of the present invention have been satisfied by the discovery of polymer mixtures P formed from poly-α-methylstyrene (PAMS) as component P1 and polyvinyl methyl ether (PVME) as component P2 which provide a compatible polymer system with LCST behavior.

BRIEF DESCRIPTION OF THE FIGURES

Various other objects, features and attendant advantages of the present invention will be more fully appreciated as the same becomes better understood from the following detailed description when considered in connection with the accompanying figures, wherein.

DETAILED DESCRIPTION OF THE PREFERRED EMBODIMENTS

Figure 1:
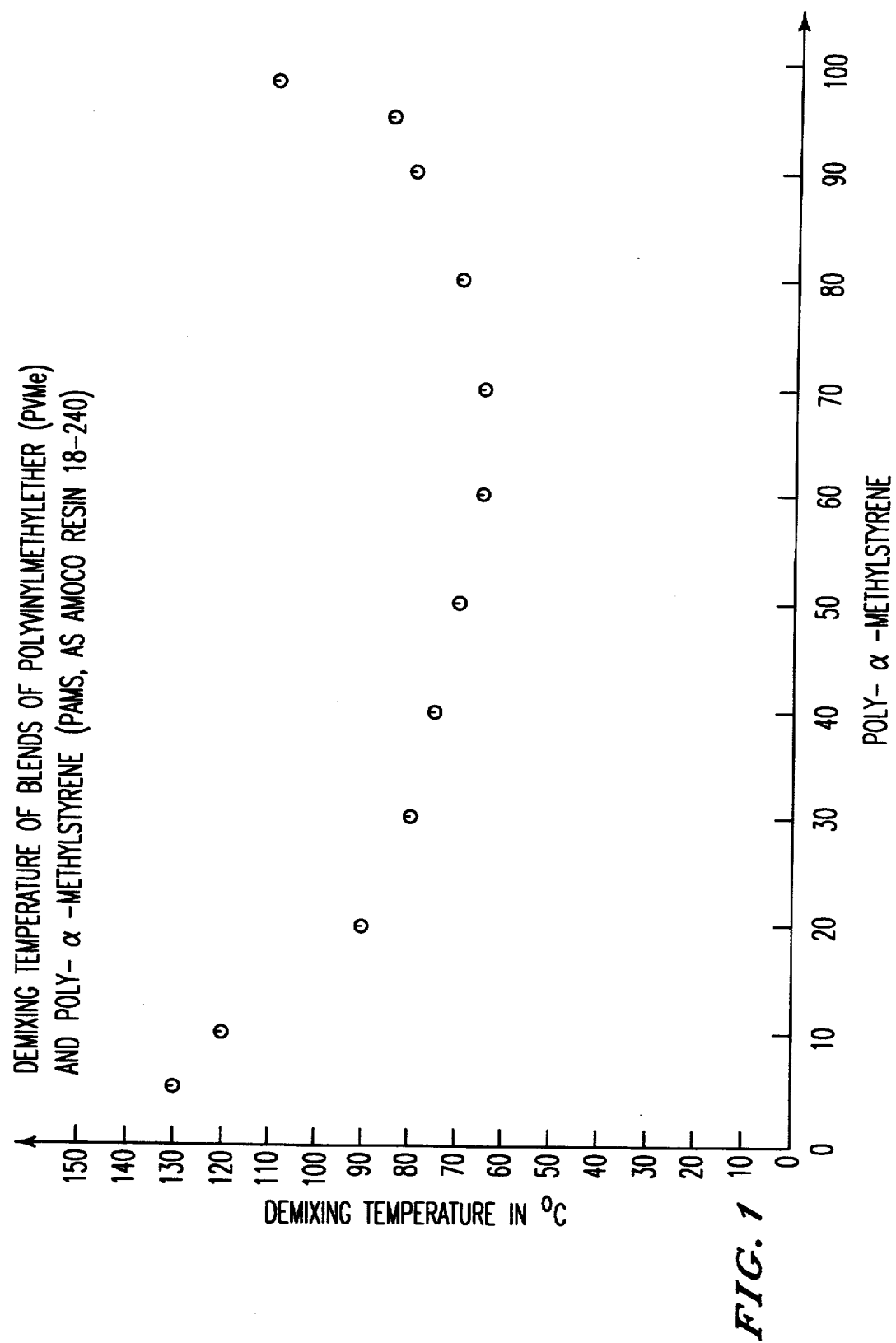
FIG. 1 shows the de-mixing curve for a mixture of PVMe and PAMS (Amoco Resin 18-240).

The present invention relates to a polymer mixture P, made of two different polymeric components, which has LCST behavior and displays temperature dependent light permeability. The polymer mixture P comprises a mixture of component P1, poly-α-methylstyrene (PAMS) or a copolymer thereof and component P2, polyvinyl methyl ether (PVMe) or a copolymer thereof.

A particularly interesting property of the present polymer mixture P is the very sharp transition from a highly transparent and colorless condition to a white, de-mixed (phase separated) condition, which occurs at about 60° C.

Preferably, the weight ratio of the components P1 and P2 in the polymer mixtures P is in the range from 98:2 to 2:98, more preferably 90:10 to 10:90, most preferably 80:20 to 20:80. The indices of refraction of polymers P1 and P2 above the LCST must differ by at least a value of 0.01, preferably differing more than 0.01, most preferably differing more than 0.03.

Polymer component P1:

Polymer component P1, PAMS, is manufactured industrially and is commercially available in various grades and qualities. These commercially available products are usable for the purposes of the present invention. (See Kirk-Othmer, loc. cit., Vol. 21, 795–797.)

α-Methylstyrene is much less reactive than styrene, and polymerizes much slower. Traditionally, pure α-methylstyrene is obtained as a byproduct of phenol manufacture (from cumene). The PAMS polymers for use in the present invention are comprised of α-methylstyrene in the amount of at least 80 wt. % and as much as 100 wt. %. Monomers which are copolymerizable with α-methylstyrene can be used, such as styrene, as long as they do not impair the required properties of the polymer system P.

The number average molecular weight Mw of the polymer P1 is in the range from 600–200,000 Dalton (determined by gel permeation chromatography, see Mark, H. F., et al., 1987, "Encyclopedia of polymer science and engineering", 2nd Ed., Vol. 10, pub. J. Wiley, 11–18). In the present invention, relatively low molecular weight polymers of α-methylstyrene are preferred having number average molecular weights in the range from 600–10,000 Dalton, more preferably in the range from 600–2000 Dalton. Suitable polymers having the preferred molecular weights and good application characteristics are commercially available (such as Amoco Resin 18-240, with Mw=790; and Amoco Resin 18-290, Mw=960; supplied by Amoco Corp.) (number average molecular weights determined by vapor phase osmometry). However, in mixing with component P2, there is no critical dependence on the molecular weight of the component P1.

Polymer component P2:

Various methods are known for preparing monomeric methyl vinyl ether (see Kirk-Othmer, 1983, loc. cit., Vol. 23, 937–959; and Houben-Weyl, 1987, "Methoden der organischen Chemie", 4th Ed. Vol E20/2, pub George Thieme Verlag, 1071–1088). The polymerization may be carried out under the influence of cationic initiators, particularly Lewis acids, or by free radical means, via the action of UV or heat. In the last-named cases, the principal products are low molecular weight homopolymers in the form of viscous oils. Also, stereo-regular homopolymers have been described, such as those produced with $Fe_2O_3$ as an initiator in toluene (Hino, M., et al., 1980 Chem. Lett., 8, 963). Low polymerization temperatures, low monomer concentrations (e.g. < 10 wt. %), and nonpolar solvents result in high isotacticity of the polymer product.

Suitable PVMe's are commercially available, (such as Lutonal ® supplied by BASF, having a specific viscosity $\eta_{sp}$ on the order of 0.68; and Gantrez ® supplied by GAF, having an $\eta_{sp}$ in the range 0.3–0.5). Polyvinyl ethers are known to be sensitive to oxygen and radiation. Therefore it is preferred to add up to 1 wt. % of at least one conventional antioxidant (such as those described in Ullmann's, loc.cit., 459–507).

P2 may also be a copolymer of vinyl methyl ether and a copolymerizable monomer. Monomers which are copolymerizable with vinyl methyl ether can be used, as long as they do not impair the required properties of the polymer system P.

Production of the polymer mixture P:

The polymer mixture P may be produced using a conventional polymer mixing process (see Ullmann's, 1992, loc.cit., Vol. 21A, 277–281). There are no limitations on the method to produce the mixture P. For example, polymer mixtures P may be produced by intensive mechanical mixing of components P1 and P2 in the melt or in an extruder, or as so-called solution cast polyblends produced from a common solvent. (See Kirk-Othmer, 1982, loc.cit., Vol. 18, 443–478.)

The polymer mixture P may also be produced by common precipitation from solution using precipitation agents. The mixing may be by homogeneous mixing in the melt with the use of a heatable mixing apparatus at suitable temperatures, or in kneaders or preferably extruders, such as one- or multi-screw extruders or extruders with oscillating screws and shear rods (such as a Bussco kneader).

Production of the mixture from a common solvent is especially preferred due to the large difference in the glass transition temperatures of the two polymers P1 and P2.

Clear transparent films can be produced by casting from a common solvent, such as toluene. These films remain clear after drying but become snow white upon heating. These transitions are extraordinarily sharp using the mixtures P of the present invention. Accordingly, the polymer mixtures P are particularly suited for use as thermally writable coatings, bar codes or for indicating expiration dates.

The de-mixing temperature of the polymer mixtures P is in the range from 60°–100° C., depending on composition. This temperature may be further reduced by addition of a third conventional low molecular weight or oligomeric component W. Particularly suitable as components W are low molecular weight substances such as softening agents, plasticizers, stabilizers UV absorbers, colorants, processing aids, solvents or combinations thereof.

In addition it is possible to vary the de-mixing temperature by modifying the polymers P1 and P2 so that one or both are a copolymer instead of a homopolymer. However, the use of homopolymers is particularly preferred.

Suitable plasticizers for use in the polymer mixture P of the present invention include esters of phthalic acid, such as dioctyl phthalate. (See Gnamm, H., and Fuchs, O., 1980, "Loesungsmittel und Weichmachungsmittel", 8th Ed., Vols. I and II, pub. Wissenschaftliche Verlagsgeselischaft Stuttgart.) In general, the content of W is in the range 0.1–1000 parts by weight, preferably 5–300 parts by weight, based on the total weight of polymer P1+polymer P2. As noted above, the polymer mixtures P may also contain conventional stabilizers, UV absorbers, colorants, and processing-aid additives, in conventionally used amounts, ordinarily less than 5 wt. % (See "Ullmanns Encyclopaedie der technischen Chemie", 1978, 4th Ed., Vol. 15, 275–280; and "Ullmann's encyclopedia of industrial chemistry", Vol. A20, loc.cit.). The handling and application possibilities of the polymer mixtures P are substantially the same as set forth in U.S. Pat. Nos. 4,722,595 and 4,722,506.

A particularly interesting advantage of the present mixture P is the good long term stability of the white coloration—because of the high glass transition temperature of the PAMS P1. Maturation to produce larger domains with different scattering characteristics, such as observed in other systems, does not occur with the system of the present invention. Thus, the present polymer mixture P may be used directly as a thermally writable coating.

Advantageous effects:

A particular advantage of the present mixture is that those polymer mixtures having a high content of PAMS (>70 wt. % of P1) undergo thermally reversible de-mixing. Such blends undergo a sharp transition from clear and colorless to white when the temperature is increased to above the de-mixing temperature, and when re-cooled the de-mixed samples return to a clear, colorless, compatible mixture within a few minutes or at most a few hours. To obtain reversible de-mixing, it is preferred to limit the amount of plasticizer to 10 wt. % or less. Surprisingly, the de-mixing property displays good reversibility even at parts of the mixing range where the mixture is hard and immobile.

When the present polymer mixture P is to be used outdoors, it is advantageous to provide suitable heat and light stabilization using conventional light stabilizers or heat stabilizers. Indoor applications are possible with essentially no limitations, however. An example of a possible application is as a thermally activated indicator, such as an alarm indicator to indicate when a prescribed temperature is exceeded, in industry or in the home. Such indicators are useful safety features when used in connection with installations and apparatus which generate heat when operated. Specific applications include use as signs on oven doors, steam tables, heating cabinets and saunas.

Obviously, numerous modifications and variations of the present invention are possible in light of the above teachings. It is therefore to be understood that within the scope of the appended claims, the invention may be practiced otherwise than as specifically described herein.

EXAMPLES

Example 1

PVMe, Mw c. 50,000, was dissolved in toluene to form a 20% solution. PAMS, Mw c. 80,000, was also dissolved in toluene to form a 20% solution.

The polymer solutions were mixed in various weight ratios (Table 1) and dried (first at room temperature under normal pressure and then at 30° C. in vacuum for 24 hr). The films obtained thereby were clear and colorless.

When the films were heated, depending on the mixing ratio, the materials underwent de-mixing, evidenced by a transition from clear and colorless to a white coloration, at c. 70° C., or above. The de-mixing temperatures as a function of the composition of the polymer mixture P are given in Table 1.

TABLE 1

| De-mixing temperatures of poly-α-methylstyrene/ polyvinyl methyl ether mixtures P: | | |
|---|---|---|
| Composition of polymer mixture (wt. %) | | De-mixing temperature (°C.) |
| PVMe, P2 | PAMS, P1 | |
| 99 | 1 | 120 |
| 95 | 5 | 100 |
| 85 | 15 | 81 |
| 75 | 25 | 75 |
| 65 | 35 | 74 |
| 55 | 45 | 73 |
| 45 | 55 | 72 |
| 35 | 65 | 72 |
| 25 | 75 | 76 |
| 15 | 85 | 77 |
| 5 | 95 | 85 |
| 1 | 99 | 105 |

Example 2:

PVMe (Mw 50,000) and PAMS (Amoco Resin 18-240, Mn according to manufacturer's data=790 g/mol) were each dissolved in toluene to produce 20% solutions.

The polymer solutions were mixed in various weight ratios and dried to produce polymer blend films as described in Example 1.

For all mixture ratios, clear and colorless films were obtained which when heated de-mixed to-form a white polymer mixture.

FIG. 1 shows the de-mixing curve for the PVMe/Amoco Resin 18-240 mixture. With slow heating and cooling, the mixtures with a content of Amoco Resin 18-240 > 80% underwent reversible de-mixing, i.e. upon re-cooling the mixtures became clear again.

Figure 2:
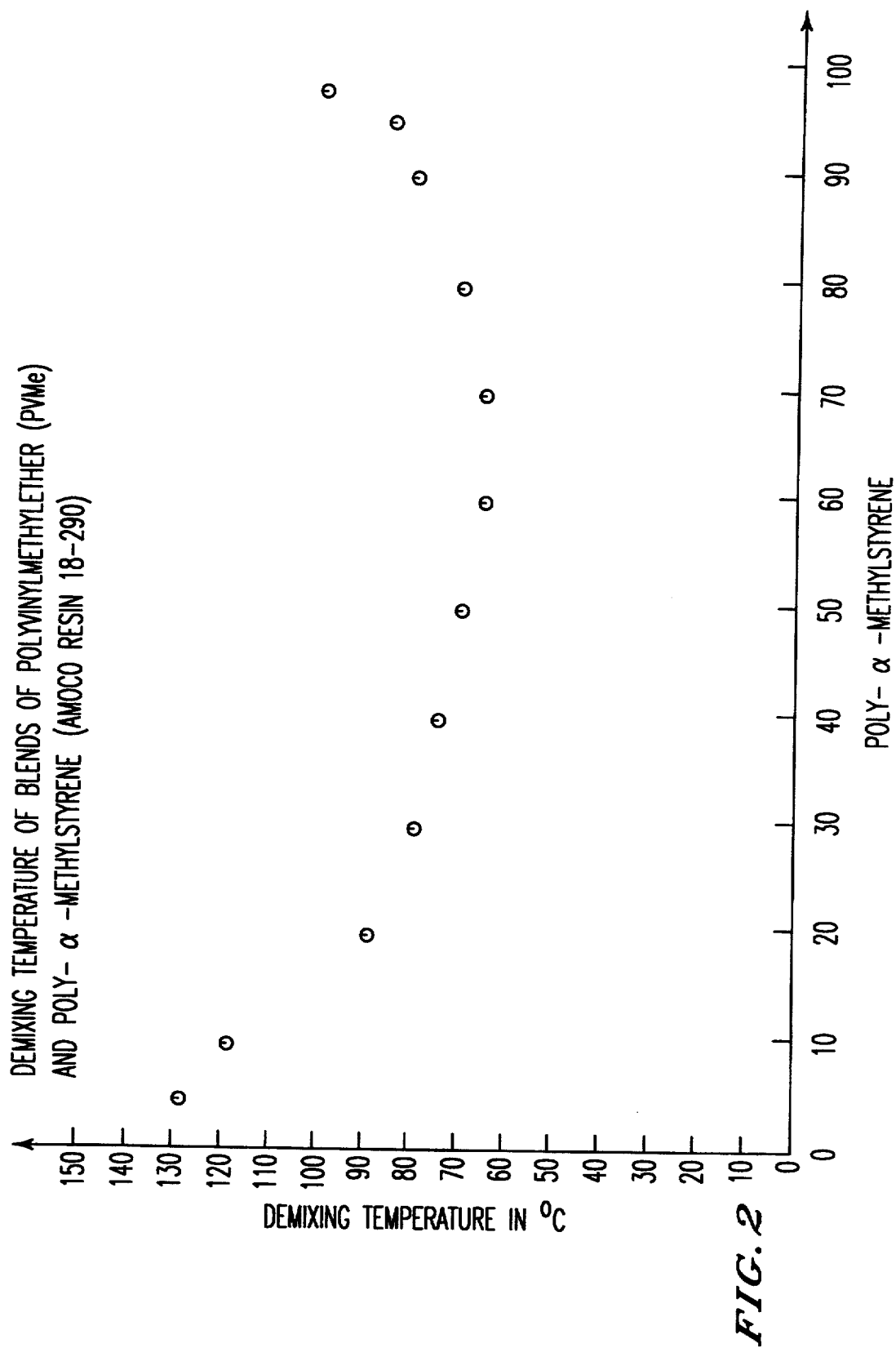
FIG. 2 shows the de-mixing curve for a mixture of PVMe and PAMS (Amoco Resin 18-290).

Example 3:

The same procedure was used as in Example 2, except that a different PAMS Amoco Resin 18-290, with according to manufacturer's data=960 g/mol was employed. In this case as well, the polymer films obtained after drying were clear and colorless, and again de-mixing occurred when these polymer films were heated. The corresponding de-mixing curve is shown in FIG. 2.

Figure 3:
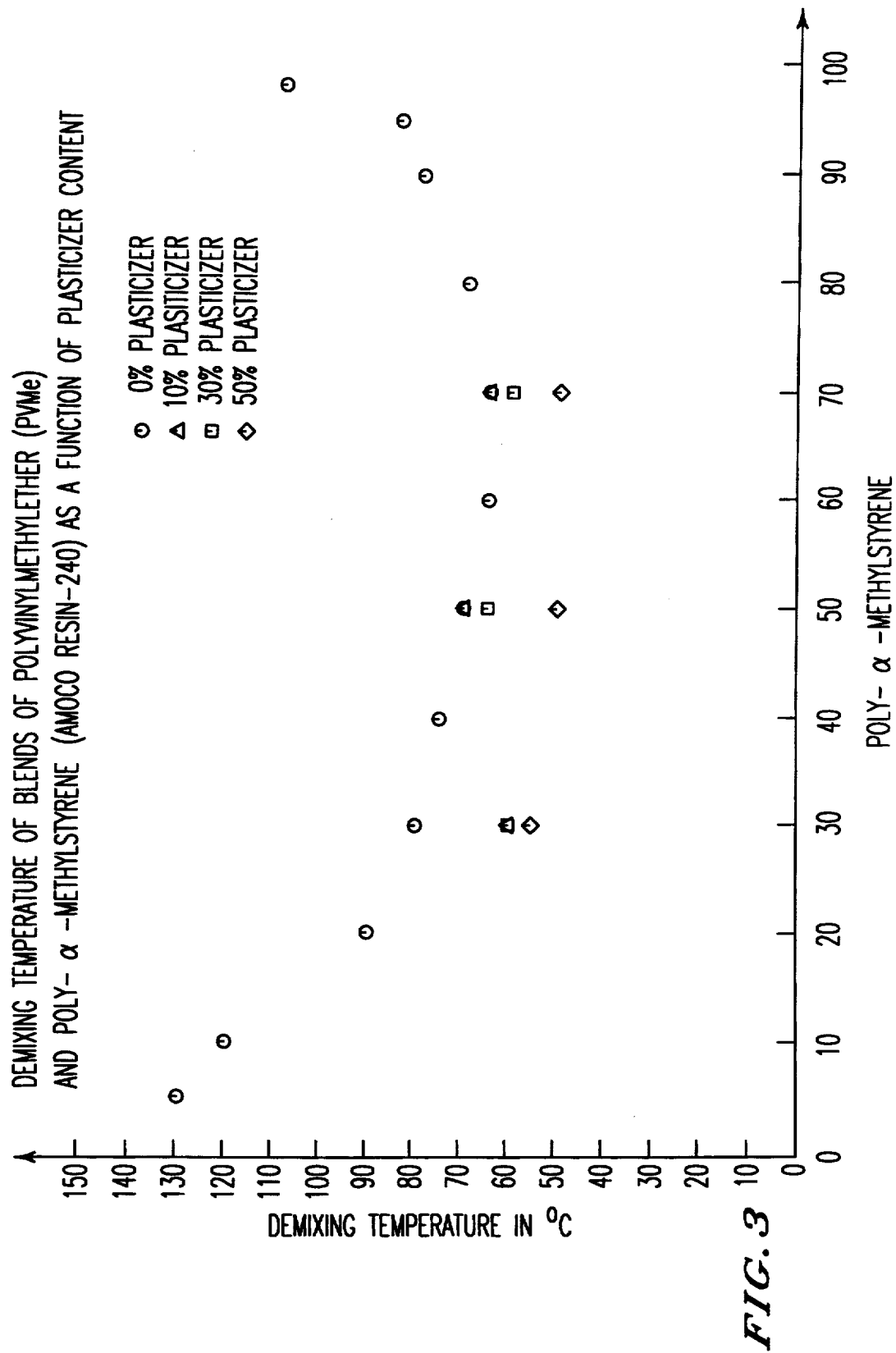
FIG. 3 shows the dependence of the de-mixing curve of a mixture of PVMe and PAMS (Amoco Resin 18-240) on the amount of plasticizer present in the mixture.

Example 4:

Dioctyl phthalate in the amount of 10 wt. %, 30 wt. %, and 50 wt. %, respectively (based on the sum of the amounts of PVMe and Amoco Resin 18-240) was added to polymer mixtures of 30, 50, and 70 parts PVMe and 70, 50, and 30 parts PAMS (Amoco Resin 18-240), respectively. The mixtures were then dried as described in Example 2. Clear, colorless polymer films were obtained which de-mixed upon heating. The de-mixing temperatures are shown in FIG. 3. As may be seen from FIG. 3, the addition of the plasticizer caused the de-mixing temperatures to decrease. The mixtures with 70% PAMS (Amoco Resin 18-240) in particular showed good reversibility of de-mixing when they contained added plasticizer; these polymer mixtures are thus well suited for use as optical switches.

What is claimed as new and desired to be secured by Letters Patent of the United States is:

1. A compatible polymer mixture P having LCST behavior, comprising;
   P1: from 98 to 2% by weight of a polymer of at least 80 wt. % α-methylstyrene; and
   P2: from 2 to 98% by weight of polyvinyl methyl ether.

2. A polymer mixture P according to claim 1, wherein component P1 is present in an amount of from 90 to 10% by weight and component P2 is present in an amount of from 10 to 90% by weight.

3. A polymer mixture P according to claim 1, wherein component P1 has a molecular weight of the polymer of from 600 to 10,000 Dalton.

4. A polymer mixture P according to claim 3, wherein component P1 has a molecular weight of from 600–2,000 Dalton.

5. A polymer mixture P according to claim 1, further comprising a low molecular weight component W in amounts of 0.1–1000 parts by weight, said component W comprising at least one of stabilizers, UV absorbers, colorants, processing aids or solvents.

6. A polymer mixture P according to claim 1, wherein said polymer mixture P has a de-mixing temperature of from 60° to 100° C.

7. A polymer mixture P according to claim 5, wherein said polymer mixture exhibits reversible temperature dependant light permeability and comprises component P1 in an amount of from 70 to 98% by weight and component P2 in an amount of from 30 to 2% by weight.

8. A polymer mixture P according to claim 1, consisting essentially of components P1 and P2.

9. A polymer mixture P according to claim 1, wherein P1 is a homopolymer of α-methylstyrene.

* * * * *